G. Borden. Jr,
Vacuum Pan.
No. 1,306. Reissued May 13. 1862.
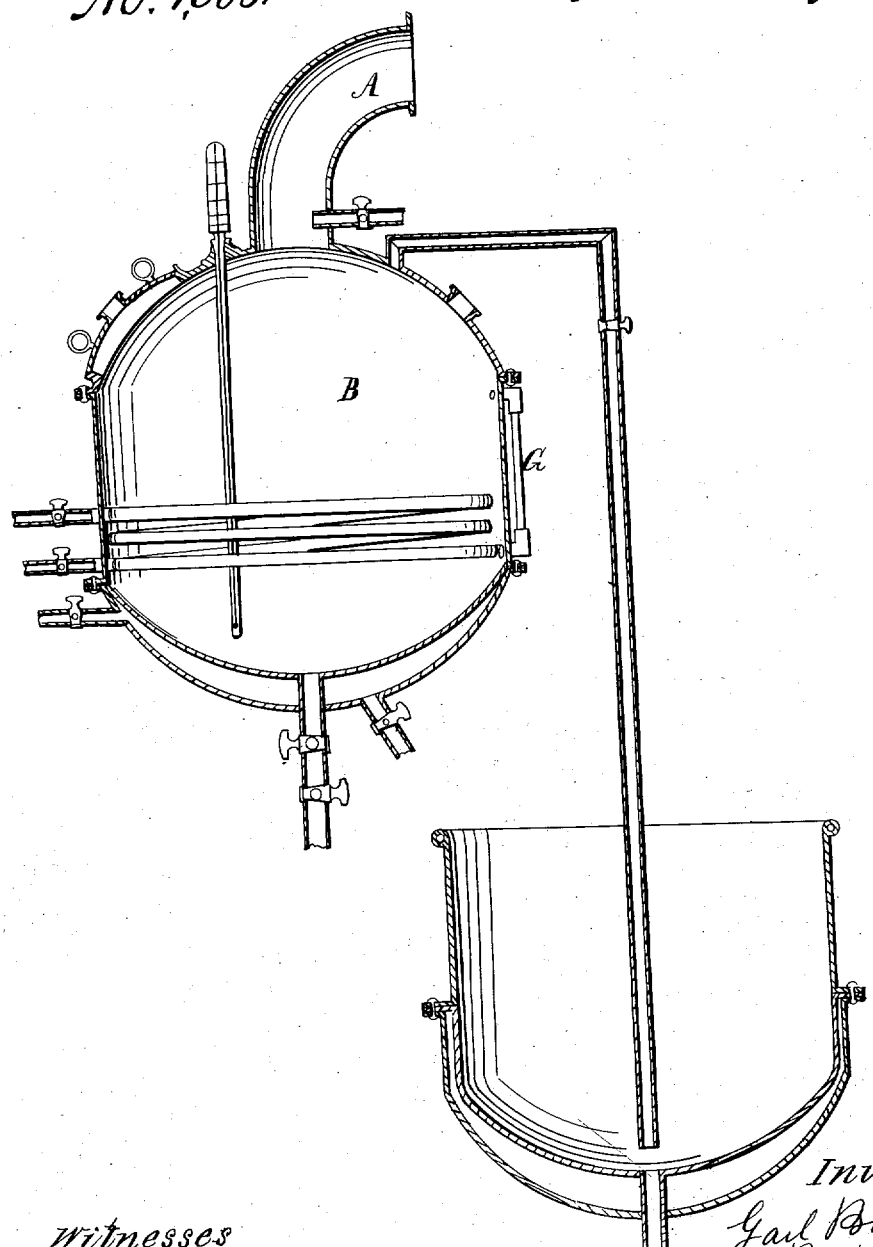
Witnesses
Gustavus Dietrich
R. L. Cobbs
Inventor
Gail Borden Jr
By Munson, Fenwick & Lawrence
Attorneys

UNITED STATES PATENT OFFICE

GAIL BORDEN, JR., OF AMENIA, NEW YORK.

IMPROVEMENT IN CONCENTRATING AND PRESERVING SWEET MILK.

Specification forming part of Letters Patent No. 15,553, dated August 19, 1856; Reissue No. 1,306 dated May 13, 1862.

*To all whom it may concern:*

Be it known that I, GAIL BORDEN, Jr., of the town of Amenia, in the county of Dutchess and State of New York, have discovered and invented a new and useful Process and Improvement for the Concentration and Preservation of Milk; and I do hereby declare that the following is a full, clear, and exact description of the same, reference being had to the annexed drawing, which is a vertical view or elevation of the apparatus, and forms a part of this specification.

To enable others skilled in the art to make and use my invention, I hereby describe its nature and mode of operation.

My invention and discovery consists in concentrating milk in a vacuum-vessel out of contact with the atmosphere to prevent incipient decomposition or any hurtful change in the constituent elements of the milk during the process of evaporation.

B is a vacuum boiler or pan for concentrating the milk.

A is a pipe connected with the vacuum-boiler, and to an air-pump and condenser.

The milk is boiled and concentrated in the vacuum-vessel B by means of steam applied in any of the well-known methods, and the application of the air-pump and condenser. When a steam-pipe is employed inside of the boiler, it should be so coiled that every part of it may be reached by the hand, so that it may be thoroughly and readily cleansed. Both a steam pipe and jacket may be employed at the same time. A thermometer may be inserted into the boiler and a vacuum-gage connected with it to indicate the temperature of the boiling fluid and the extent of the vacuum.

The milk to be concentrated is to be first scalded as soon as practicable after the milking. This may be done in tin, brass, or copper cans heated in a bath of boiling water. By scalding the milk at a temperature of from 150° to 200° Fahrenheit previous to its being concentrated, portions of its albumen coagulate and adhere to the surface of the vessel. The milk is then strained through a fine wire-cloth strainer into a reservoir, from which it is to be drawn into the vacuum pan or boiler by atmospheric pressure. By this scalding and straining a large portion of the albumen of the milk is removed, by which a twofold purpose is effected. The albumen of the milk is more ready to suffer decomposition than any of the other constituent elements of the milk, its removal renders the milk less liable to change and become affected by contact with the atmosphere; and, besides, the coagulated albumen soon coats the vessel in which it is boiled, so as greatly to interfere with the process of co-operation, besides producing other injurious effects. The process above described removes and prevents these effects in a great degree. Even the portion of the albumen which is not thereby removed appears to be changed or rearranged in such a way as not to be productive of the consequences resulting from its presence before the scalding and straining process.

I have ascertained that after the scalding, as above described, it is not absolutely essential to strain the milk at all. The mere scalding effects the purpose sought in a very great degree, though I prefer to strain the milk in the manner above stated. The reservoir in which the milk is thus scalded may be an open boiler with a steam-jacket, in order that the milk may be heated to a higher degree than can be done in the bath, and for the purpose above mentioned. The boiling or working of the vacuum-boiler is conducted in a similar manner to that of vacuum-pans in the manufacture of refined sugar in the common way, except that I find it best first to place a small quantity of the milk in the boiler, and after the boiling has commenced to let the milk flow into the boiler from the reservoir by a stream gradually running into it, regulated in quantity in such a manner as always, or during the principal part of the evaporating process, to keep and maintain the fluid in the boiler B at about the same consistency or state of spissitude.

The arrangement and position of the vessels employed may be made to conform with the building in which they are placed.

For the purpose of ascertaining the degree of concentration at any time, the discharge-pipe at the bottom of the boiler is provided with two cocks placed from two to four inches apart, according to the size of the pipe. When wishing to try the degree of concentration, the upper cock is opened, when the fluid will descend to the lower one. The upper cock is then closed and the lower one opened, thus letting out a small quantity of the fluid. I find that a uniform degree of consistency is best ascertained by cooling this trial portion of milk to a given temperature, which is quickest done in a tin vessel placed in a mixture of ice and salt.

Milk may be concentrated to any degree required. I do not confine myself to any one standard. For plain condensed milk, reduce it seventy-five to eighty per cent., according to the quality of the milk, varied by the season, food, &c. For preserved milk combined with sugar or extract of coffee, it may be reduced still further.

The better to regulate the quantity of milk in the boiler, it is provided with a glass gage, G, on or beside which figures representing quarts or gallons are marked. After the milk has been drawn into the boiler, and when reduced in quantity to any desired figure, as shown in the gage, I increase the heat of the milk in the pan by gradually breaking the vacuum, or reducing the vacuum until the temperature rises from 195° to 205°; then taking off the steam and letting the vacuum again increase, the evaporation again commences, and is continued until the milk arrives at the proper consistency. If upon trial the milk is not found thick enough, steam may be again applied and slowly continued until further trials indicate a completion. If found too thick, hot water, to be provided in the reservoir or otherwise, may be let into the pan to restore it to a proper consistency while the ebullition is still going on. By thus treating and evaporating the milk it is found that much of the odor of the cow and other disagreeable odors are evolved and sent off; and it is also found useful, in making plain condensed or concentrated milk, to prevent in this way the granulation or crystallization of the sugar of milk, and to insure a greater uniformity of consistency. In concentrated milk combined with sugar, coffee, or other extracts, this process of extra heating in the pan is not necessary. The process of concentration completed, the milk is transferred directly from the pan into tin cans, usually holding about forty quarts, but filled only about four-fifths full. These are immediately put into a bat, of cold water and cooled, employing ice in warm weather. To hasten the cooling process I employ tin cylinders of the full length of the can and four or five inches in diameter, containing six or eight quarts. Into these broken ice is put from time to time, drawing out the water by a siphon and replenishing with ice, as may be necessary. This cylinder is employed as a stirrer as well as a refrigerator. In plain concentrated milk the process of cooling is continued until the milk marks a temperature below 45°, and in warm weather below 40°. In cooling concentrated milk combined with sugar, coffee, or other extracts, it is not necessary to reduce the temperature lower than 55°, which may be done without the cylinders, using common stirrers.

I have discovered that the water in milk can be expelled without changing the qualities of its other constituents, if evaporated out of contact with the air, by preventing the action of the oxygen upon the milk while in the process of concentration, thereby preventing incipient decomposition or any hurtful change.

Like blood, milk is a living fluid, and as soon as drawn from the cow it begins to die, change, or decompose. In no other process for concentrating milk with which I am acquainted has any adequate means been adopted to prevent incipient decomposition or other hurtful change of the milk.

The milk is prepared for use by adding water in proportion to the degree of concentration to which it has been subjected, and when in this state will produce an equal quantity of cream with the original milk. It is rendered preservative and soluble without the use of sugar or any antiseptic, which has not, to my knowledge, ever been effected before.

Besides the advantages of concentrating milk *in vacuo*, there is no means yet discovered by which evaporation is so rapidly and safely conducted. Milk concentrated by my plan can be afforded for less than half the price at which other concentrated milk has usually been sold. My process will cause milk to become into as general common use as sugar.

Having thus explained my invention, I would state that I am well aware that sugar and various extracts have been and are now concentrated in a vacuum under a low degree of heat to prevent discoloration and burning. I do not claim boiling milk and concentrating it in a vacuum for any such purpose.

I am also aware that scalding milk to improve its preservative qualities has been long known, and that it has been kept in hermetically-sealed vessels. I do not claim these processes.

I am also aware that milk has been combined with sugar and other soluble substances to render it preservative and soluble. I make no claim to the discovery of any such advantage resulting from the use of any foreign substances. It is evident, however, that their presence would not interfere with the working of my process. My invention is intended to include the concentration of milk when these foreign ingredients are added, as well as when used entirely free from them. In fact, I sometimes mingle sugar or the extract of coffee or other substances with the milk during the process of concentration, not for the purpose of aiding the operation proper of my process, but for other reasons not now necessary to be stated, some of which are sufficiently obvious.

What I claim as my invention, and desire to secure by Letters Patent, is—

1. Concentrating sweet milk by evaporaton *in vacuo*, substantially in the manner and for the purpose above set forth.

2. In the process of concentrating sweet milk *in vacuo*, the preparatory scalding of the milk by heating it to a temperature of from 150° to 200° Fahrenheit, substantially in the manner and for the purpose above described.

GAIL BORDEN, JR.

Witnesses:
CHAS. WARREN,
DE WITT C. LAWRENCE.